United States Patent
Fujimoto et al.

(10) Patent No.: US 11,687,844 B2
(45) Date of Patent: Jun. 27, 2023

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventors: Hideki Fujimoto, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 115 days.

(21) Appl. No.: 17/108,013

(22) Filed: Dec. 1, 2020

(65) Prior Publication Data

US 2021/0365844 A1    Nov. 25, 2021

(30) Foreign Application Priority Data

May 25, 2020    (JP) .............................. JP2020-090880

(51) Int. Cl.
*G06Q 10/02*    (2012.01)
*G07C 9/00*    (2020.01)
*G06Q 10/0631*    (2023.01)

(52) U.S. Cl.
CPC ....... *G06Q 10/02* (2013.01); *G06Q 10/06311* (2013.01); *G07C 9/00904* (2013.01)

(58) Field of Classification Search
CPC ............. G06Q 10/02; G06Q 10/06311; G07C 9/00904
USPC ........................................................... 705/5
See application file for complete search history.

(56) References Cited

U.S. PATENT DOCUMENTS

| | | | |
|---|---|---|---|
| 2015/0181152 A1* | 6/2015 | Holbrook ........... | H04N 21/4882 348/564 |
| 2019/0318329 A1* | 10/2019 | Castinado ............ | G06Q 20/102 |
| 2021/0329447 A1* | 10/2021 | Varghese ............. | G06Q 10/109 |

FOREIGN PATENT DOCUMENTS

| | | |
|---|---|---|
| JP | 2019-113896 A | 7/2019 |
| JP | 2019-113897 A | 7/2019 |
| JP | 2019-113900 A | 7/2019 |
| JP | 2019-113901 A | 7/2019 |

OTHER PUBLICATIONS

"The Evolution of trust in Airbnb: a case of home rental" Published by Elsevier (Year: 2019).*

* cited by examiner

*Primary Examiner* — Zeina Elchanti
(74) *Attorney, Agent, or Firm* — Oliff PLC

(57) ABSTRACT

An information processing apparatus includes a processor configured to acquire reservation information on a rental space and perform, using the reservation information, processing of prompting a user to perform a predetermined task that is to be performed before or after using the rental space.

16 Claims, 9 Drawing Sheets

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-090880 filed May 25, 2020.

BACKGROUND

(i) Technical Field

The present disclosure relates to an information processing apparatus, an information processing system, and a non-transitory computer readable medium.

(ii) Related Art

Japanese Unexamined Patent Application Publication No. 2019-113896 proposes an information processing apparatus that determines, on the basis of conversation information, whether or not a user has performed a cleaning action and that rewards a predetermined target related to the cleaning action if it is determined that the cleaning action has been performed.

Japanese Unexamined Patent Application Publication No. 2019-113897 proposes an information processing apparatus that acquires environment information indicating an environment around a user, that determines, on the basis of the environment information, whether the user is to perform cleaning, and that provides the user with information about cleaning on the basis of a determination result.

Japanese Unexamined Patent Application Publication No. 2019-113900 proposes an information processing apparatus that acquires environment information indicating an environment around a user and detected by a movable work robot and that estimates a cleaning status of the user in a room on the basis of the environment information.

Japanese Unexamined Patent Application Publication No. 2019-113901 proposes an information processing apparatus that acquires a result of determination of whether or not a user is to perform cleaning and that performs, if the determination result indicates that the user is to perform cleaning, output control to output information about cleaning to a predetermined position in a room.

SUMMARY

In a space renting service, various tasks such as preparation and cleaning are to be performed by a service provider before renting out a space. Aspects of non-limiting embodiments of the present disclosure relate to an information processing apparatus, an information processing system, and a non-transitory computer readable medium that are capable of reducing tasks to be performed by a service provider compared to the case of performing all tasks by the service provider.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire reservation information on a rental space and perform, using the reservation information, processing of prompting a user to perform a predetermined task that is to be performed before or after using the rental space.

BRIEF DESCRIPTION OF THE DRAWINGS

An exemplary embodiment of the present disclosure will be described in detail based on the following figures, wherein.

DETAILED DESCRIPTION

Figure 1:
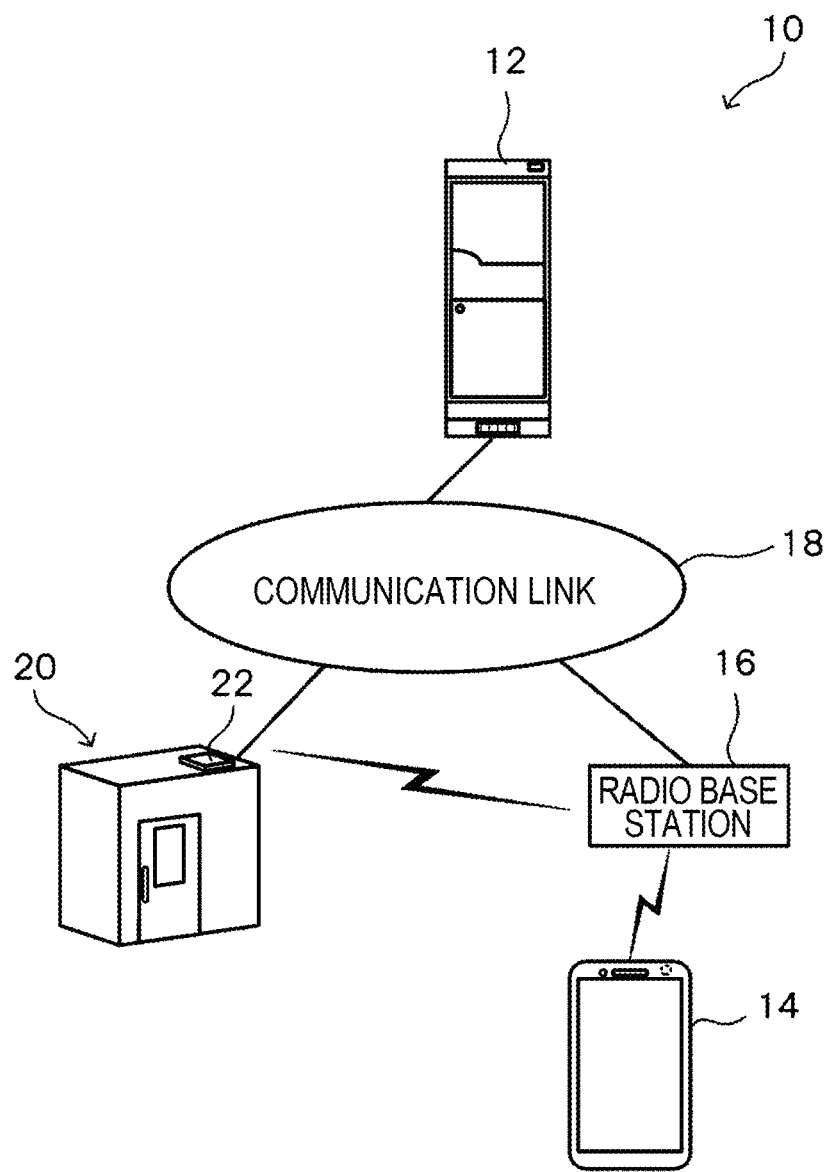
FIG. 1 is a diagram illustrating a schematic configuration of an information processing system according to the exemplary embodiment.

Hereinafter, an exemplary embodiment of the present disclosure will be described in detail with reference to the drawings. FIG. 1 is a diagram illustrating a schematic configuration of an information processing system 10 according to the exemplary embodiment.

As illustrated in FIG. 1, the information processing system 10 according to the exemplary embodiment includes a cloud server 12 serving as an information processing apparatus, a radio base station 16, and a communication apparatus 22.

The cloud server 12, the radio base station 16, and the communication apparatus 22 are connected to a communication link 18. The communication apparatus 22 may be connected to the communication link 18 via the radio base station 16 instead of being directly connected to the communication link 18, as illustrated in FIG. 1.

The cloud server 12 provides a service related to a rental space 20. Examples of the renting service include a service of accepting a reservation for the rental space 20 and a service of unlocking and renting out the rental space 20 to a user who has made a reservation.

The radio base station 16 wirelessly connects to a mobile terminal apparatus 14 such as a smartphone, connects the mobile terminal apparatus 14 to the communication link 18, and performs communication between apparatuses connected to the communication link 18.

The communication apparatus 22 is provided in the rental space 20 and transmits various signals to or receives various signals from the cloud server 12 and an apparatus connected to the communication link 18.

Figure 2:
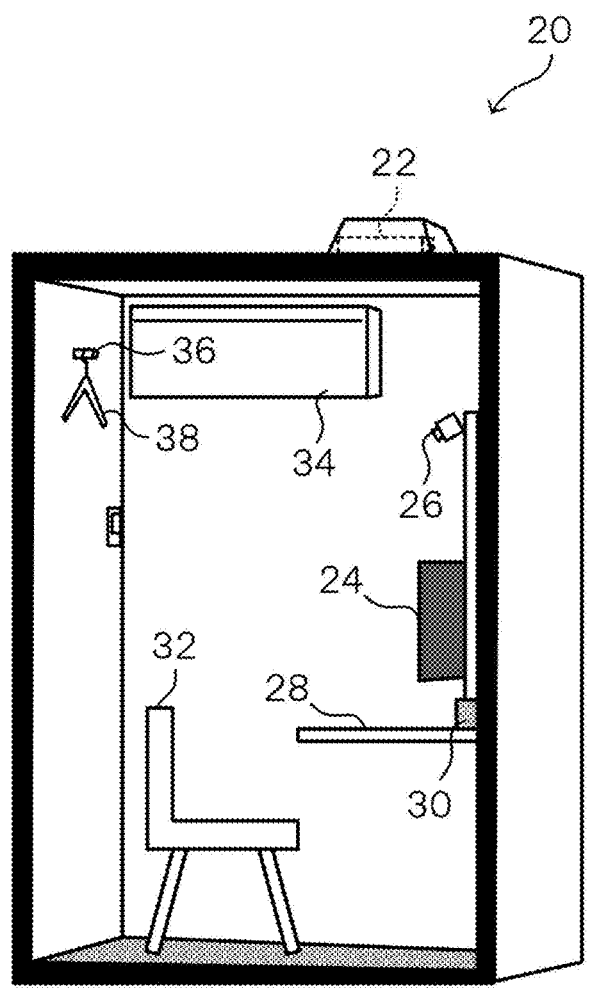
FIG. 2 is a diagram illustrating a schematic configuration of a rental space.

Now, the rental space 20 will be described. FIG. 2 is a diagram illustrating a schematic configuration of the rental space 20.

In the exemplary embodiment, the rental space 20 provides, for example, an environment to be used for telework. Specifically, as illustrated in FIG. 2, the rental space 20 is provided with a desk 28, a chair 32, a power supply and universal serial bus (USB) outlet 30, a display 24, an air conditioner 34, a camera 26, and the communication apparatus 22. In addition, the rental space 20 is provided with stationery, a hook 36 for a hanger 38, and so forth.

Although the camera 26 for capturing an image of the rental space 20 is provided in the exemplary embodiment, the camera 26 may be omitted.

A user who wants to use the rental space 20 checks on a website the location and reservation status of the rental space 20 closest to the user and makes a reservation by using a smartphone, a personal computer, or the like. After that, the user unlocks the rental space 20 by using the mobile terminal apparatus 14 such as a smartphone and uses the rental space 20.

Figure 3:
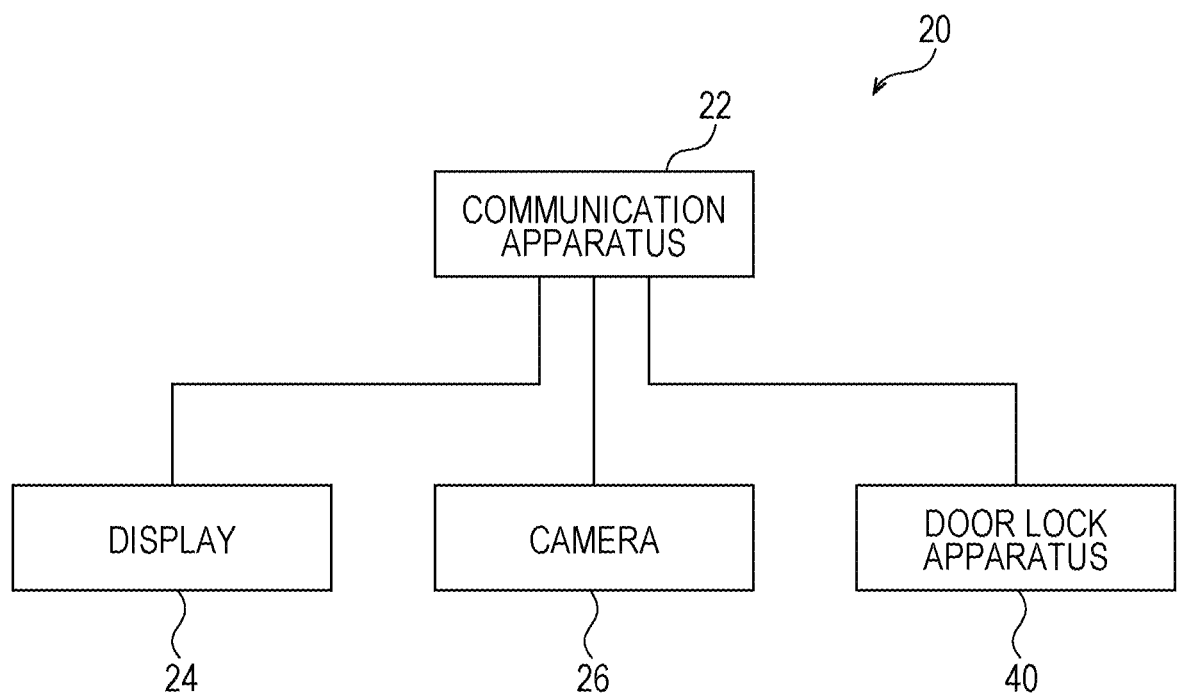
FIG. 3 is a block diagram illustrating an electrical configuration of the rental space.

Next, an electrical configuration of the rental space 20 will be described. FIG. 3 is a block diagram illustrating an electrical configuration of the rental space 20.

The rental space 20 includes the display 24, the camera 26, and a door lock apparatus 40 that are connected to the communication apparatus 22.

The display 24 displays various pieces of information to be presented to a user. For example, the display 24 displays information or the like received from the cloud server 12.

The camera 26 captures an image of the rental space 20 and transmits the captured image to the cloud server 12 via the communication apparatus 22 and the communication link 18.

The door lock apparatus 40 is disposed on the door of the rental space 20, and locks and unlocks the door. For example, the door lock apparatus 40 unlocks the door in response to receipt of an unlocking instruction transmitted from the cloud server 12 via the communication link 18 and the communication apparatus 22.

Figure 4:
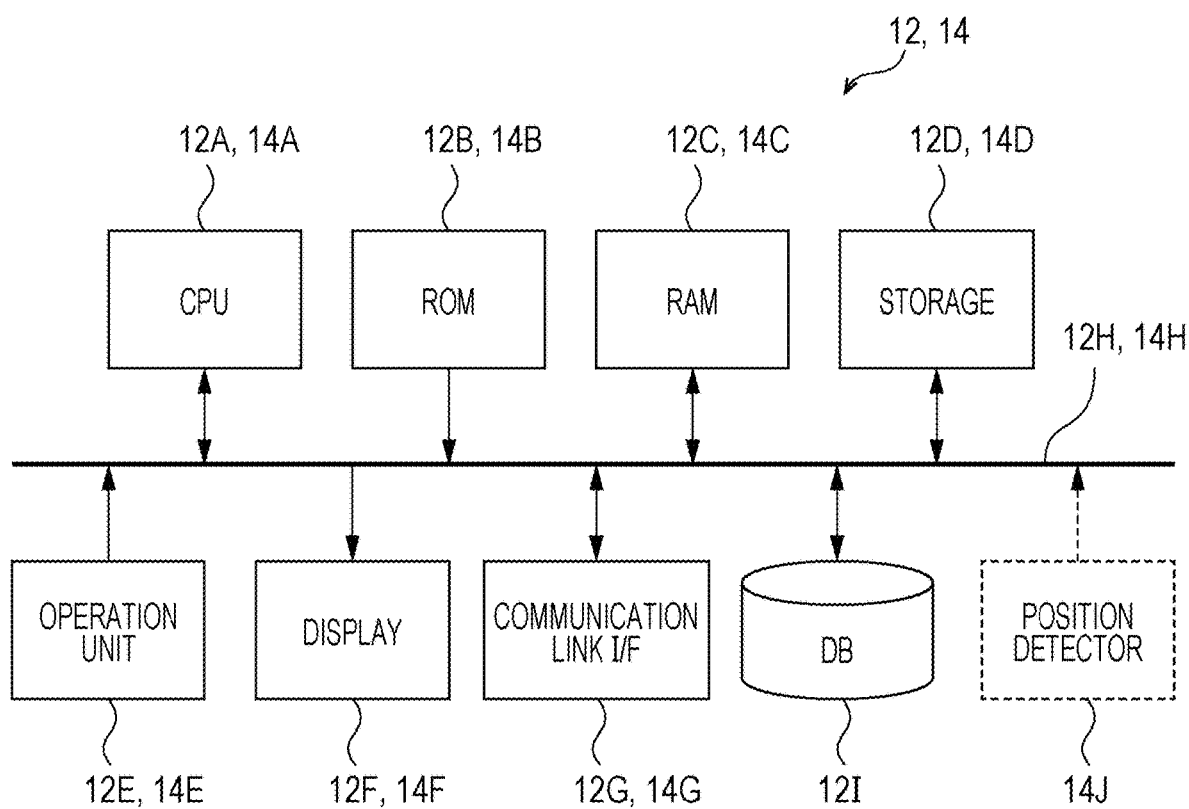
FIG. 4 is a block diagram illustrating the configuration of an electric system of a cloud server and a mobile terminal apparatus in the information processing system according to the exemplary embodiment.

Next, a schematic configuration of the cloud server 12 and the mobile terminal apparatus 14 will be described. FIG. 4 is a block diagram illustrating the configuration of an electric system of the cloud server 12 and the mobile terminal apparatus 14 in the information processing system 10 according to the exemplary embodiment. Both the cloud server 12 and the mobile terminal apparatus 14 basically have a typical computer configuration and thus the cloud server 12 will be described here.

As illustrated in FIG. 4, the cloud server 12 according to the exemplary embodiment includes a central processing unit (CPU) 12A which is an example of a processor, a read only memory (ROM) 12B, a random access memory (RAM) 12C, a storage 12D, an operation unit 12E, a display 12F, and a communication link interface (I/F) 12G. The CPU 12A controls the operation of the entire cloud server 12. The ROM 12B stores in advance various control programs, various parameters, and the like. The RAM 12C is used as a work area or the like during execution of various programs by the CPU 12A. The storage 12D stores various pieces of data, application programs, and the like. The operation unit 12E is used to input various pieces of information. The display 12F is used to display various pieces of information. The communication link I/F 12G is connected to the communication link 18 and transmits various pieces of data to or receives various pieces of data from another apparatus connected to the communication link 18. The above-described individual components of the cloud server 12 are electrically connected to each other by a system bus 12H. As the storage 12D, for example, a nonvolatile storage unit such as a hard disk drive (HDD), a solid state drive (SSD), or a flash memory is used.

The cloud server 12 further includes a database (DB) 12I that stores various pieces of information such as installation places and reservation statuses of rental spaces 20 to be managed.

With the above-described configuration, the cloud server 12 according to the exemplary embodiment executes, using the CPU 12A, access to the ROM 12B, the RAM 12C, and the storage 12D, acquisition of various pieces of data via the operation unit 12E, and display of various pieces of information on the display 12F. In addition, the cloud server 12 controls, using the CPU 12A, transmission and reception of communication data via the communication link I/F 12G.

The mobile terminal apparatus 14 has a configuration basically similar to that of the cloud server 12 except that the mobile terminal apparatus 14 includes a position detector 14J depicted with a broken line in FIG. 4, and includes a CPU 14A which is an example of a processor, a ROM 14B, a RAM 14C, and so forth.

The position detector 14J detects the current position of the mobile terminal apparatus 14. For example, a signal from a Global Positioning System (GPS) satellite includes time data of an atomic clock mounted in the satellite, information about the orbit of the satellite, and so forth. The position detector 14J receives radio waves from GPS satellites and calculates the distances from the satellites on the basis of differences in time between transmission and reception. The position detector 14J measures the position of a point in a space by using the distances from three or more GPS satellites, thereby detecting the position of the mobile terminal apparatus 14.

The cloud server 12 according to the exemplary embodiment having the above-described configuration performs processing such as acceptance of a reservation for the rental space 20. In addition, the cloud server 12 acquires reservation information on the rental space 20 and performs, using the reservation information, processing of prompting a user to perform a predetermined task that is to be performed before or after using the rental space 20. Hereinafter, a description will be given of an example in which a predetermined task is cleaning and tidying up, which is an example of a task of cleaning the rental space 20. The predetermined task is not limited thereto and may be, for example, a task of making equipment ready for use or changing layout. Hereinafter, cleaning and tidying up will be simply referred to as cleaning. Cleaning includes making a state ready for use by a next user.

In the case of prompting a user to perform cleaning, a notification indicating the place of cleaning equipment and a cleaning method may be provided. The place of cleaning equipment is, for example, the place of wet tissues, a broom, a mop, or the like. The cleaning method is, for example, a method of wiping the desk 28, the display 24, and the chair 32 with a wet tissue, a method of cleaning the floor with a broom or a mop, or the like. The notification may be provided by displaying it on the display 24 or by using a sound. Alternatively, the notification may be transmitted to the mobile terminal apparatus 14 of the user.

Next, a description will be given of an example of a specific service provided by the cloud server 12 in the information processing system 10 having the above-described configuration.

The cloud server 12 provides a service of accepting a reservation for the rental space 20. For example, the cloud server 12 receives an operation of making a reservation from the mobile terminal apparatus 14 via a website or application for reserving the rental space 20, thereby accepting the reservation for the rental space 20 from a user and manages the reservation. For example, the cloud server 12 acquires from the mobile terminal apparatus 14 user information and reservation information such as a reservation location and a reservation time, and manages the reservation information as a reservation status. The reservation status includes reservation information of plural users and is stored in the DB 12I.

In the exemplary embodiment, when a user makes a reservation for the rental space 20, if the rental space 20 is not reserved for a certain time period, the cloud server 12 performs processing of prompting a next user who makes a reservation to perform cleaning.

When a user uses the rental space 20, if the rental space 20 is not reserved for a certain time period after the time period for which the user uses the rental space 20, the cloud server 12 performs processing of prompting the user to perform cleaning. For example, the cloud server 12 displays a message of prompting the user to perform cleaning on the display 24.

In addition, when the rental space 20 is continuously used by the same user or when the rental space 20 is continuously used with plural reservations, the cloud server 12 performs, a predetermined time period (for example, 5 minutes) before the end of the continuous use, processing of prompting the user to perform cleaning.

Even when the rental space 20 is used for a long time period longer than or equal to a predetermined time period, the user may be prompted to perform only ventilation if the rental space 20 is determined to be tidied up. If the user agrees, the cloud server 12 may perform processing of prompting the user to keep the door of the rental space 20 open for a certain time period (for example, 1 minute). For example, the cloud server 12 transmits a message such as "Please keep the door open for a while." to the communication apparatus 22 so that the message is displayed on the display 24. When the rental space 20 has a driving unit such as a motor for driving the door to open or close the door, the cloud server 12 may control the driving unit to keep the door open for a certain time period and then close the door. When the rental space 20 is provided with a ventilation facility, the cloud server 12 may perform control to drive the ventilation facility for a certain time period.

Even when the rental space 20 is used for a short time period shorter than or equal to a predetermined time period, the cloud server 12 performs processing of prompting the user to perform cleaning if the used rental space 20 is determined not to be tidied up.

If the user agrees to cooperate in cleaning the rental space 20, the cloud server 12 may perform, for example, processing of shortening the usage period and discounting the usage fee accordingly. The agreement may be input at the time of making a reservation or a predetermined time period (for example, 5 or 10 minutes) before the end of use by using an application installed in the mobile terminal apparatus 14 or the like.

The degree of cleaning performed by a user may be determined not only by comparing images captured by the camera 26 but also by using the degree of cleaning expressed as points by the next user of the rental space 20. The cloud server 12 may perform processing of adding a determination result as cleaning points of the user. A user having a larger number of cleaning points may be given higher priority for making a reservation, or the usage fee may be discounted according to the cleaning points. When the tidy-up level of a user is lower than a predetermined level, the cloud server 12 may perform processing of transmitting a message to the mobile terminal apparatus 14 or the like of the user so as to encourage improvement in a future use. The message may be, for example, a positive message such as "You will get coupons if you use the space cleanly next time, thank you for your consideration." The message may be given by displaying it on the display 24 or outputting it as a sound from a speaker when the user leaves the rental space 20. Alternatively, the message may be transmitted to an email address or chat account registered in the application of the mobile terminal apparatus 14 of the user after the user leaves the rental space 20 or after a certain time period elapses from the leaving.

In the processing of prompting a user to perform cleaning, a notification indicating that cleaning is recommended may be constantly provided. Because some users may find such a notification annoying, guidance of cleaning may be displayed on the display 24 when the rental space 20 is assumed to be dirty after continuous use for a predetermined time period, for example, after use for three consecutive hours or after use for one hour or more by the same user.

When the rental space 20 is continuously used by the same user or when the rental space 20 is continuously used with plural reservations, a message prompting the user to perform cleaning may be displayed on the display 24 a predetermined time period (for example, 5 minutes) before the end of the continuous use.

If the user agrees to cooperate in cleaning the rental space 20, the usage period of the user may be shortened and the usage fee may be discounted accordingly. The agreement to perform cleaning may be input at the time of making a reservation or a predetermined time period (for example, 5 or 10 minutes) before the end of use by using the application installed in the mobile terminal apparatus 14 or the like.

The level of a cleaning result may be determined from images captured by the camera 26 before and after cleaning. If the level is lower than or equal to a predetermined threshold value, a discount rate or the number of points may be reduced.

Next, a description will be given of an example of a specific process performed by the information processing system 10 according to the exemplary embodiment having the above-described configuration.

Figure 5:
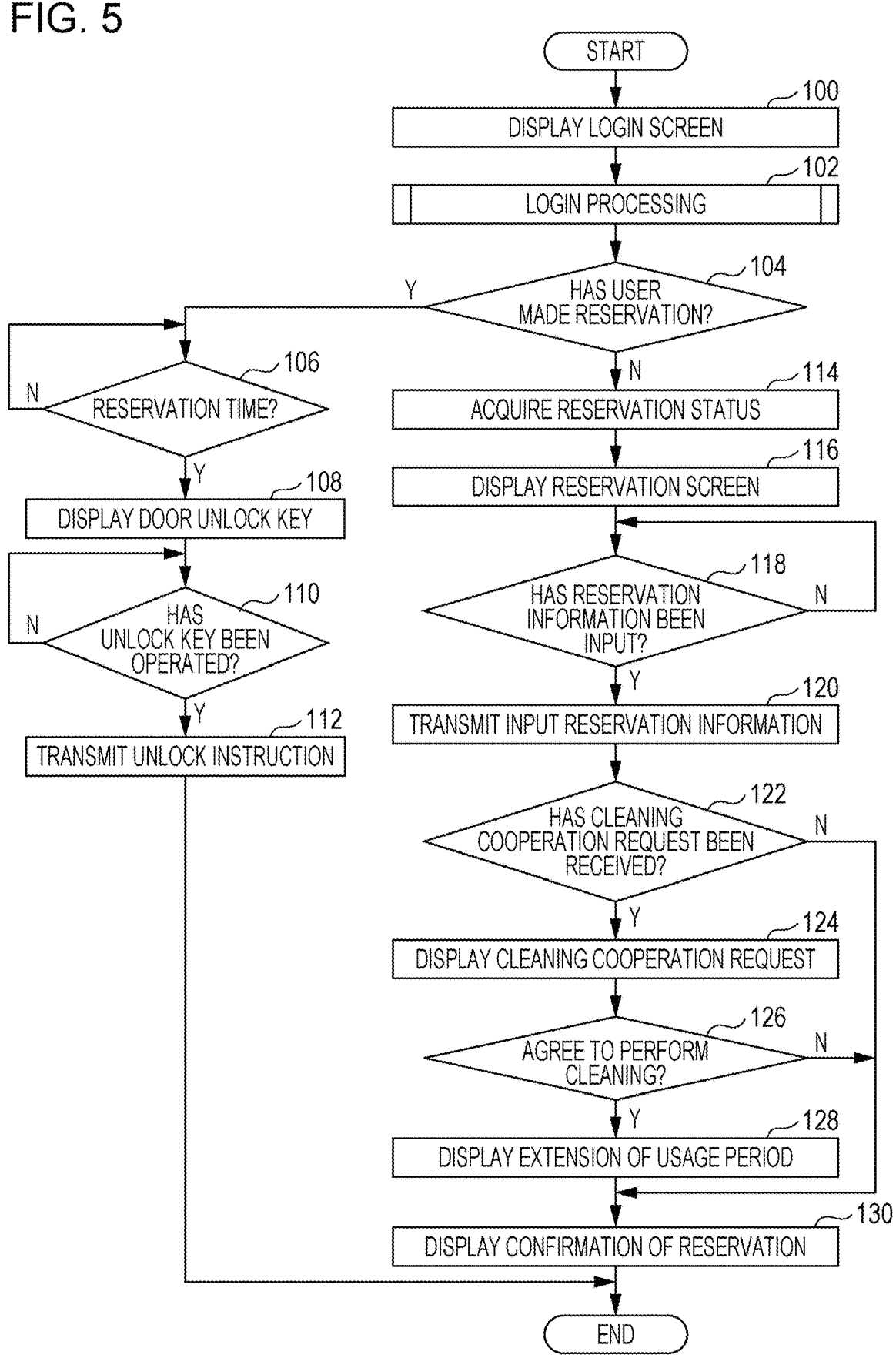
FIG. 5 is a flowchart illustrating an example of a process flow from when a reservation is made to when the rental space is unlocked, performed by the mobile terminal apparatus of the information processing system according to the exemplary embodiment.

First, a description will be given of an example of a specific process performed by the mobile terminal apparatus 14 such as a smartphone from when a reservation is made to when the rental space 20 is unlocked. FIG. 5 is a flowchart illustrating an example of a process flow from when a reservation is made to when the rental space 20 is unlocked, performed by the mobile terminal apparatus 14 of the information processing system 10 according to the exemplary embodiment.

In step 100, the CPU 14A displays a login screen on the display 14F, and then the process proceeds to step 102. For example, a predetermined login screen is displayed on the display 14F in response to access to a site or application for reserving the rental space 20 from the mobile terminal apparatus 14 such as a smartphone.

In step 102, the CPU 14A performs login processing, and then the process proceeds to step 104. For example, user information input through the operation unit 14E is transmitted to the cloud server 12, and whether the user information is registered is determined. If the user information is registered, a service of making a reservation and the like is available. The authentication processing such as login processing may be performed by a server other than the cloud server 12.

In step 104, the CPU 14A determines whether or not the logged-in user has made a reservation. If the determination is affirmative, the process proceeds to step 106. If the determination is negative, the process proceeds to step 114. In the exemplary embodiment, to simplify the description, it is assumed that, in step 104, processing of unlocking of the rental space 20 is performed if the user has made a reservation and processing related to a reservation is performed if the user has not made a reservation.

In step 106, the CPU 14A determines whether or not a reservation time of the logged-in user has come. The CPU 14A waits until an affirmative determination is made, and then the process proceeds to step 108. If the reservation time has not come, the CPU 14A may display the reservation time on the display 14F and execute other processing.

In step 108, the CPU 14A displays a door unlock key of the rental space 20 on the display 14F, and then the process proceeds to step 110.

In step 110, the CPU 14A determines whether or not the displayed unlock key has been operated. Specifically, the CPU 14A determines whether or not the unlock key displayed on the display 14F has been operated by the operation unit 14E. The CPU 14A waits until an affirmative determination is made, and then the process proceeds to step 112.

In step 112, the CPU 14A transmits an unlock instruction to the cloud server 12, and then the process ends. Accordingly, the unlock instruction is transmitted from the cloud server 12 to the rental space 20, the communication apparatus 22 receives the unlock instruction and provides the unlock instruction to the door lock apparatus 40, and accordingly the door of the rental space 20 is unlocked.

On the other hand, in step 114, the CPU 14A acquires a reservation status of the rental space 20, and then the process proceeds to step 116. For example, the CPU 14A acquires a reservation status indicating the dates and times reserved by other users from the DB 12I of the cloud server 12.

In step 116, the CPU 14A performs processing of displaying a predetermined reservation screen, and then the process proceeds to step 118. For example, the CPU 14A receives a reservation status from the cloud server 12 and displays on the display 14F a screen that includes the reservation status and that is to be used for making a reservation. The rental space 20 to be reserved may be designated by a user from a list. Alternatively, rental spaces 20 near a position detected by the position detector 14J may be extracted, and the user may be allowed to select one of the extracted rental spaces 20.

In step 118, the CPU 14A determines whether or not reservation information has been input by the user. The CPU 14A waits until an affirmative determination is made, and then the process proceeds to step 120.

In step 120, the CPU 14A transmits the reservation information input through the operation unit 14E to the cloud server 12, and then the process proceeds to step 122.

In step 122, the CPU 14A determines whether or not a cleaning cooperation request for the rental space 20 has been received. Specifically, the CPU 14A determines whether or not a cleaning cooperation request has been received from the cloud server 12 as a result of the processing performed by the cloud server 12, which will be described below. If the determination is affirmative, the process proceeds to step 124. If the determination is negative, the process proceeds to step 130.

In step 124, the CPU 14A displays the cleaning cooperation request on the display 14F, and then the process proceeds to step 126.

In step 126, the CPU 14A determines whether or not the user has agreed to perform cleaning. Specifically, the CPU 14A determines whether or not an operation of agreeing to perform cleaning has been performed using the operation unit 14E. If the determination is affirmative, the process proceeds to step 128. If the determination is negative, the process proceeds to step 130.

In step 128, the CPU 14A displays extension of the usage period on the display 14F, and then the process proceeds to step 130. That is, the CPU 14A notifies the user that the usage period may be extended for cleaning.

In step 130, the CPU 14A displays confirmation of the reservation on the display 14F, and then the process ends.

Figure 6:
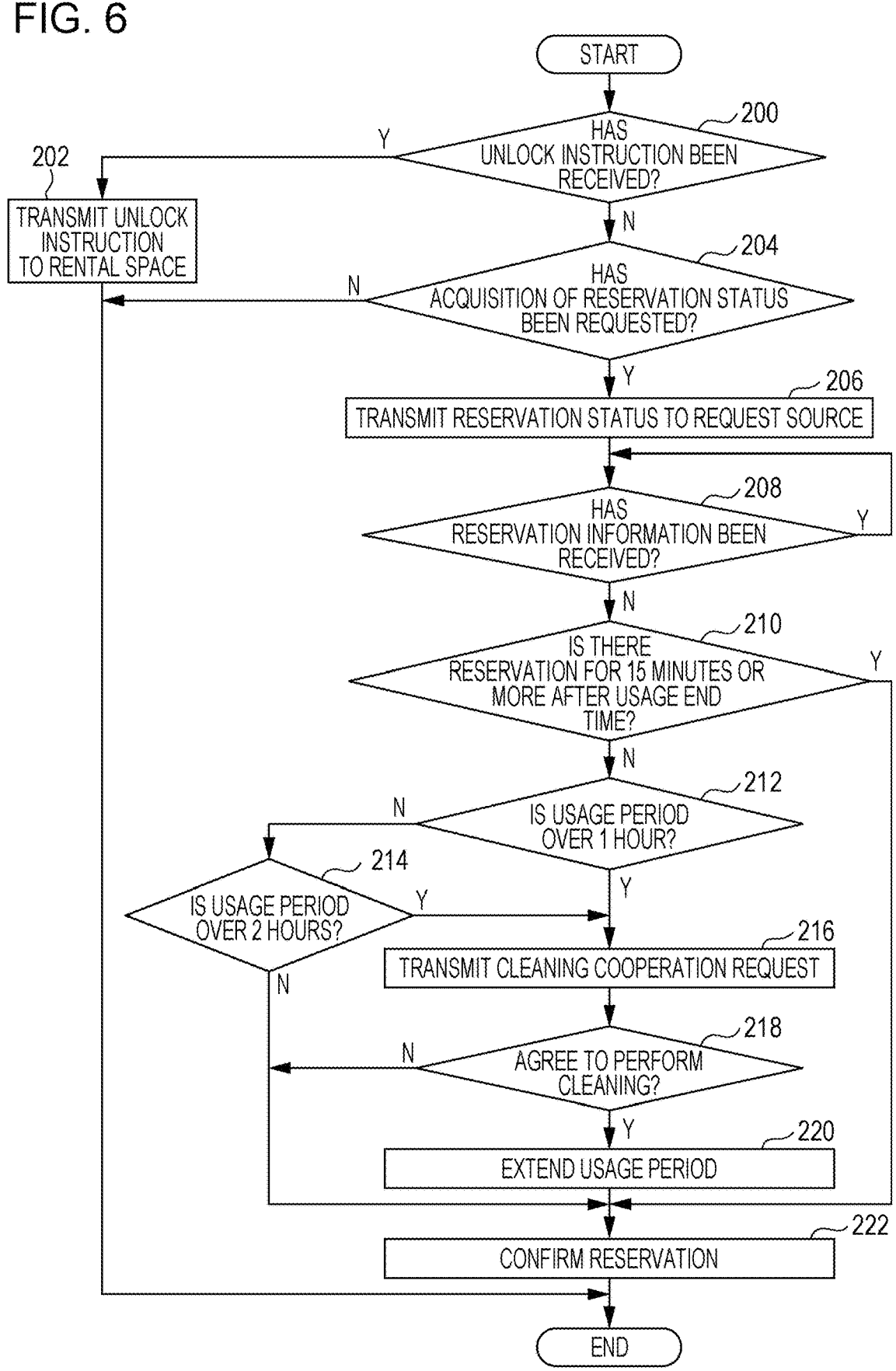
FIG. 6 is a flowchart illustrating an example of a process flow from when a reservation is accepted to when the rental space is unlocked, performed by the cloud server of the information processing system according to the exemplary embodiment.

Next, a description will be given of an example of a specific process performed by the cloud server 12 from when a reservation is accepted to when the rental space 20 is unlocked. FIG. 6 is a flowchart illustrating an example of a process flow from when a reservation is accepted to when the rental space 20 is unlocked, performed by the cloud server 12 of the information processing system 10 according to the exemplary embodiment.

In step 200, the CPU 12A determines whether or not an unlock instruction has been received from the mobile terminal apparatus 14. Specifically, the CPU 12A determines whether or not the above-described step 112 of transmitting the unlock instruction has been performed. If the determination is affirmative, the process proceeds to step 202. If the determination is negative, the process proceeds to step 204.

In step 202, the CPU 12A transmits the unlock instruction to the rental space 20, and then the process ends. Accordingly, the communication apparatus 22 receives the unlock instruction and provides the unlock instruction to the door lock apparatus 40, and thus the door of the rental space 20 is unlocked.

In step 204, the CPU 12A determines whether or not acquisition of a reservation status has been requested. Specifically, the CPU 12A determines whether or not the above-described step 114 of acquiring a reservation status by the mobile terminal apparatus 14 has been performed. If the determination is affirmative, the process proceeds to step 206. If the determination is negative, the process ends.

In step 206, the CPU 12A transmits a reservation status to the mobile terminal apparatus 14 as a request source, and then the process proceeds to step 208.

In step 208, the CPU 12A determines whether or not reservation information has been received. Specifically, CPU 12A determines whether or not the reservation information input and transmitted by the mobile terminal apparatus 14 in the above-described step 120 has been received.

The CPU 12A waits until an affirmative determination is made, and then the process proceeds to step 210.

In step 210, the CPU 12A determines whether or not there is a reservation for 15 minutes or more after a usage end time. Specifically, the CPU 12A refers to the reservation information that has been received and the reservation status stored in the DB 12I and determines whether or not there is a reservation for 15 minutes or more after the usage end time indicated in the reservation information. If the determination is negative, the process proceeds to step 212. If the determination is affirmative, the process proceeds to step 222. In step 210, it is determined whether or not there is a reservation for 15 minutes or more as an example. The reservation herein is not limited to a reservation for 15 minutes or more, and it may be determined whether or not there is a reservation for a predetermined time period or more.

In step 212, the CPU 12A determines whether or not the usage period is over 1 hour. Specifically, the CPU 12A determines whether or not the usage period indicated in the reservation information is over 1 hour. If the determination is negative, the process proceeds to step 214. If the determination is affirmative, the process proceeds to step 216. In step 212, it is determined whether or not the usage period is over 1 hour as an example. The time period herein is not limited to over 1 hour, and it may be determined whether or not the usage period is over a predetermined time period.

In step 214, the CPU 12A determines whether or not the usage period of the rental space 20 is over 2 hours. Specifically, the CPU 12A determines whether or not the total usage period including other reservations is over 2 hours. If the determination is affirmative, the process proceeds to step 216. If the determination is negative, the process proceeds to step 222. In step 214, it is determined whether or not the usage period of the rental space 20 is over 2 hours as an example. The time period herein is not limited to over 2 hours, and it may be determined whether or not the usage period of the rental space 20 is over a predetermined time period.

In step 216, the CPU 12A transmits a cleaning cooperation request to the mobile terminal apparatus 14, and then the process proceeds to step 218. Accordingly, an affirmative determination is made in the above-described step 122.

In step 218, the CPU 12A determines whether or not the user has agreed to perform cleaning. Specifically, the CPU 12A determines whether or not an operation of agreeing to perform cleaning has been performed by the user in the above-described step 126. If the determination is affirmative, the process proceeds to step 220. If the determination is negative, the process proceeds to step 222.

In step 220, the CPU 12A extends the reserved usage period, and then the process proceeds to step 222. That is, the usage period is extended in consideration of a time period to be used for cleaning.

In step 222, the CPU 12A confirms the reservation, and then the process ends. Specifically, the CPU 12A adds the reservation information to the reservation status stored in the DB 12I and notifies the mobile terminal apparatus 14 that the reservation has been confirmed, thereby displaying the confirmation of the reservation on the display 14F of the mobile terminal apparatus 14.

Figure 7:
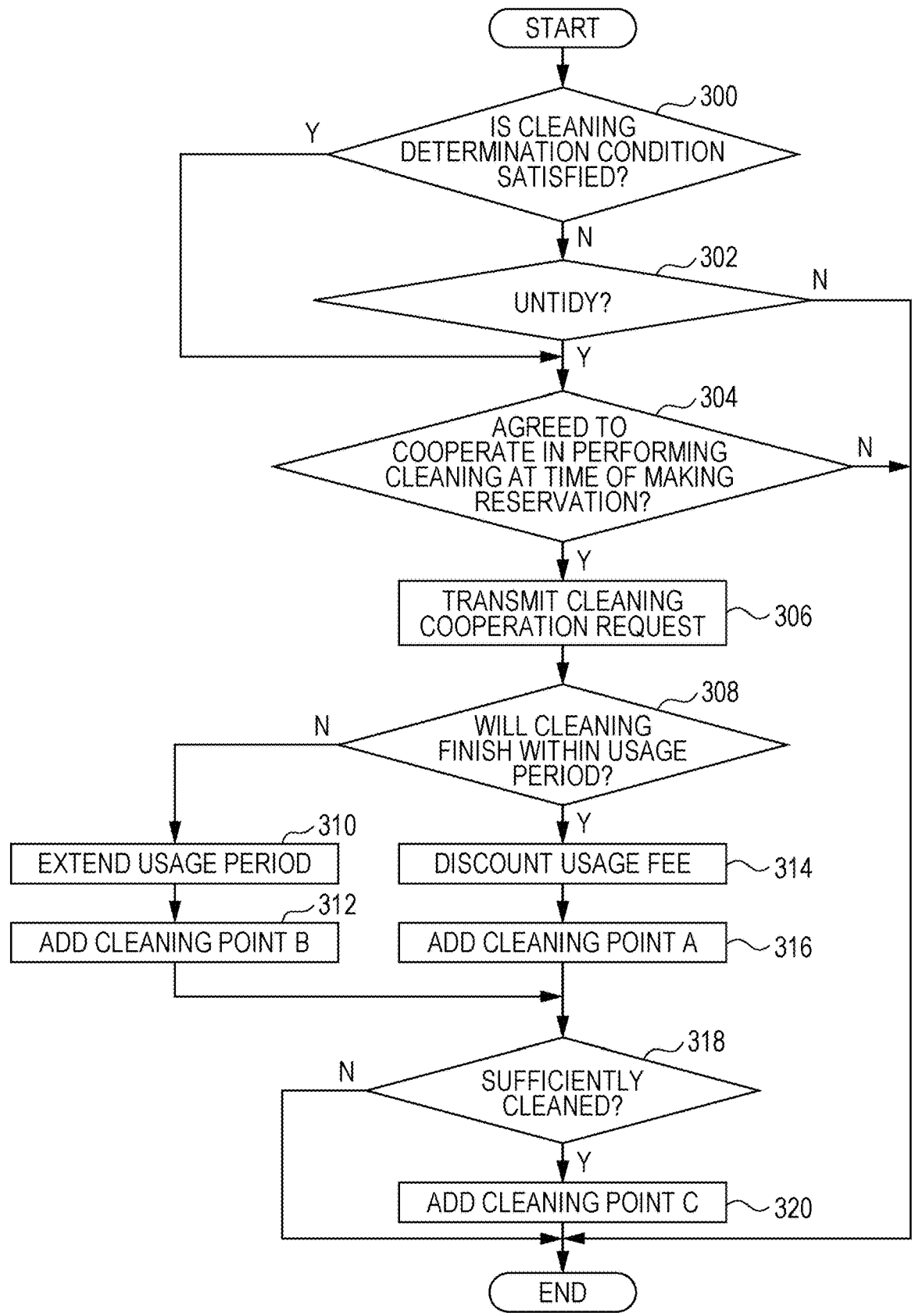
FIG. 7 is a flowchart illustrating an example of a process flow from the start to end of use of the rental space, performed by the cloud server of the information processing system according to the exemplary embodiment.

Next, a description will be given of an example of a specific process performed by the cloud server 12 from the start to end of use of the rental space 20. FIG. 7 is a flowchart illustrating an example of a process flow from the start to end of use of the rental space 20, performed by the cloud server 12 of the information processing system 10 according to the exemplary embodiment.

In step 300, the CPU 12A determines whether or not a predetermined cleaning determination condition is satisfied. Specifically, the CPU 12A determines whether or not at least one of a condition that the usage period is over a predetermined time period (for example, 1 hour) and a condition that the rental space 20 has been used for a predetermined time period (for example, 2 hours) from the last cleaning is satisfied as the cleaning determination condition. If the determination is negative, the process proceeds to step 302. If the determination is affirmative, the process proceeds to step 304.

Figure 8:
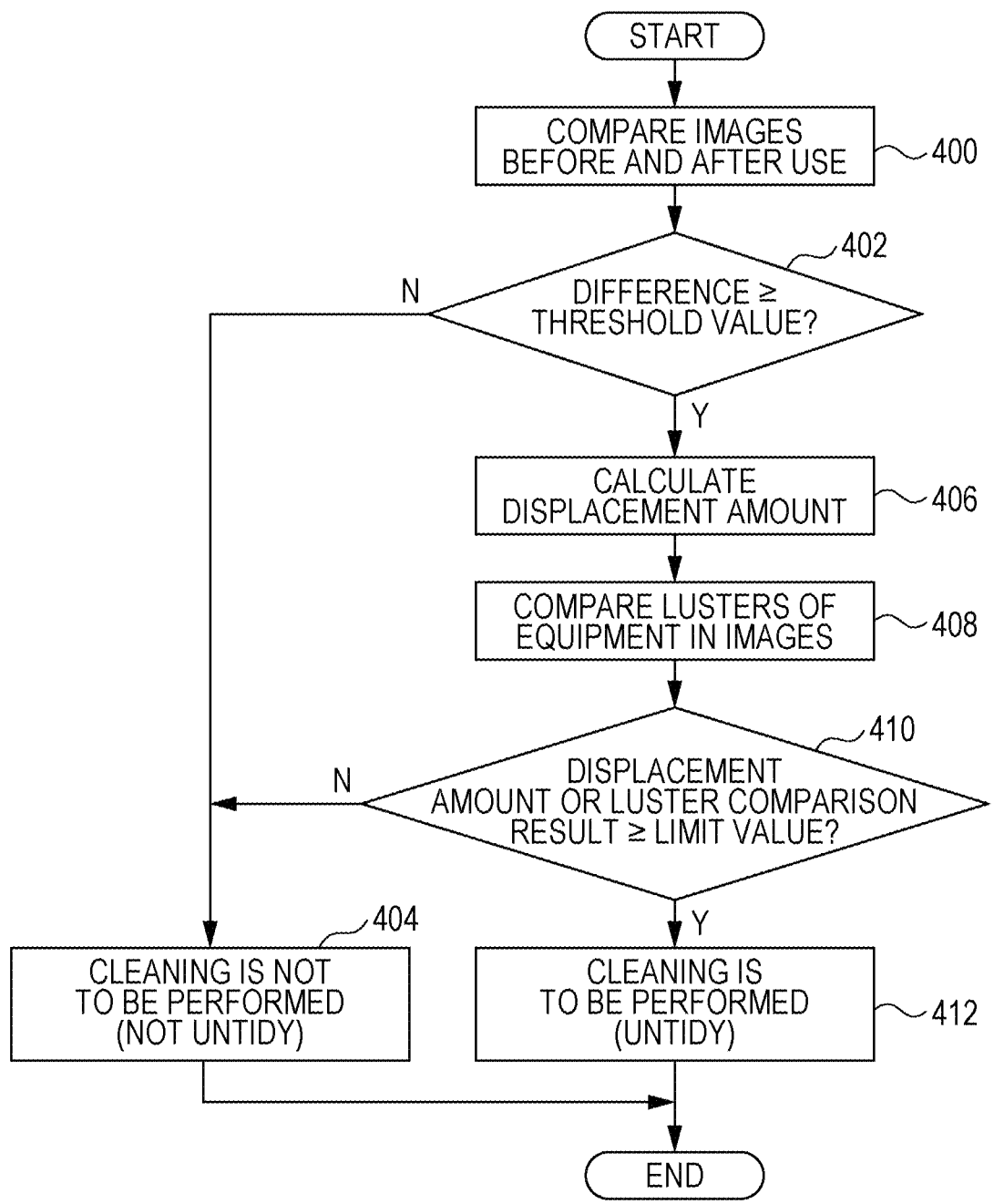
FIG. 8 is a flowchart illustrating an example of a process flow of determining whether or not the rental space is untidy.

In step 302, the CPU 12A determines whether or not the rental space 20 is untidy. If the determination is affirmative, the process proceeds to step 304. If the determination is negative, the process ends. Specifically, the CPU 12A makes a determination by performing the processing of determining whether or not the rental space 20 is untidy illustrated in FIG. 8. FIG. 8 is a flowchart illustrating an example of a process flow of determining whether or not the rental space 20 is untidy. Now, the process illustrated in FIG. 8 will be described.

In step 400, the CPU 12A compares images captured before and after the use, and then the process proceeds to step 402. Specifically, the CPU 12A compares images captured by the camera 26 before and after the use of the rental space 20.

In step 402, the CPU 12A determines whether or not the difference between the images before and after the use is larger than or equal to a predetermined threshold value. Specifically, the CPU 12A calculates the difference between the images before and after the use and determines whether or not the calculated difference is larger than or equal to the predetermined threshold value. If the determination is negative, the process proceeds to step 404. If the determination is affirmative, the process proceeds to step 406.

In step 404, the CPU 12A determines that cleaning is not to be performed, that is, the space is not untidy, and the process ends. That is, a negative determination is made in step 302 in FIG. 7, and the process illustrated in FIG. 7 ends.

On the other hand, in step 406, the CPU 12A calculates a displacement amount, and then the process proceeds to step 408. For example, the CPU 12A calculates the difference between the images before and after the use as a displacement amount.

In step 408, the CPU 12A compares the lusters of equipment in the images, and then the process proceeds to step 410. For example, the CPU 12A derives the brightness of a specific region such as the desk 28 or the floor in the images instead of the luster, and calculates the difference in the brightness of the specific region between the images before and after the use.

In step 410, the CPU 12A determines whether or not any one of the displacement amount calculated in step 406 and a luster comparison result calculated in step 408 is larger than or equal to a predetermined limit value. If the determination is negative, the process proceeds to step 404. If the determination is affirmative, the process proceeds to step 412.

In step 412, the CPU 12A determines that cleaning is to be performed, that is, the rental space 20 is untidy, and then the process proceeds to step 304 in FIG. 7.

Referring back to FIG. 7, in step 304, the CPU 12A determines whether or not the user agreed to cooperate in performing cleaning at the time of making the reservation. Specifically, the CPU 12A determines whether or not an affirmative determination is made in the above-described step 126 and the user agreed to cooperate in performing cleaning. If the determination is affirmative, the process proceeds to step 306. If the determination is negative, the process ends.

In step 306, the CPU 12A transmits a cleaning cooperation request for the rental space 20 a predetermined time period (for example, 5 minutes) before the usage end time designated at the time of making the reservation, thereby displaying the cleaning cooperation request on the display 24, and then the process proceeds to step 308.

In step 308, the CPU 12A determines whether or not cleaning will finish within the usage period. Specifically, for example, the CPU 12A transmits a message asking whether cleaning will finish within the usage period to the display 24 or the mobile terminal apparatus 14 of the user and acquires a response, thereby making a determination. If the determination is negative, the process proceeds to step 310. If the determination is affirmative, the process proceeds to step 314.

In step 310, the CPU 12A extends the usage period, and then the process proceeds to step 312. For example, a reservation is accepted allowing a predetermined margin so that the usage period can be extended, and the usage period is extended within the margin.

In step 312, the CPU 12A adds a predetermined point B as a cleaning point, and then the process proceeds to step 318.

On the other hand, in step 314, the CPU 12A discounts the usage fee, and then the process proceeds to step 316. For example, a predetermined amount is reduced from the usage fee to settle accounts.

In step 316, the CPU 12A adds a predetermined point A as a cleaning point, and then the process proceeds to step 318. The cleaning point A has a value larger than that of the cleaning point B.

In step 318, the CPU 12A determines whether or the rental space 20 has been sufficiently cleaned. Specifically, the CPU 12A makes a determination similarly to, for example, step 302, that is, the process illustrated in FIG. 8. If the determination is affirmative, the process proceeds to step 320. If the determination is negative, the process ends. If the rental space 20 has insufficiently been cleaned and a negative determination is made, the cleaning point added in step 312 or step 316 may be reduced.

In step 320, the CPU 12A adds a predetermined point C as a cleaning point, and then the process ends. The cleaning point C may have a value identical to or different from the value of the cleaning point A or B. In step 320, sufficient cleaning may be appreciated and a message may be transmitted to the display 24 or the mobile terminal apparatus 14 of the user. For example, a message such as "Thank you for keeping the space clean. Please come again." may be transmitted.

In the above-described exemplary embodiment, the cloud server 12 may perform processing of displaying the cleaning point of the user in the application of the mobile terminal apparatus 14 or the like or processing of displaying feedback of the degree of cleaning from another user so as to prompt the user to perform cleaning carefully.

In the above-described exemplary embodiment, the cloud server 12 may acquire, when accepting a reservation, information indicating whether the user uses a wheelchair, crutches, or the like, and may prompt the preceding user to perform cleaning while providing the space layout enabling the next user to easily use the wheelchair, crutches, or the like. For example, if the next user is a physically handicapped person, the preceding user is prompted to move an obstacle such as the chair 32 near the entrance such as the door during cleaning. Alternatively, the preceding user may be prompted to move an obstacle instead of being prompted to perform cleaning.

In the above-described exemplary embodiment, a description has been given of an example of the rental space 20 used by one user. The rental space 20 is not limited thereto, and may be a rental space usable by plural users. In this case, the cloud server 12 may acquire, when accepting a reservation, information about a desired layout of the desk 28 and the chair 32, and may prompt the preceding user to make the space in accordance with the desired layout when prompting the user to perform cleaning. Alternatively, the user may be prompted to make the space instead of being prompted to perform cleaning.

In the above-described exemplary embodiment, when trash is about to overflow or has overflown from a trash can during cleaning, the user may operate a trash call button or the like provided in the application of the mobile terminal apparatus 14, so that a cleanup worker contracted in advance may come to collect the trash when the rental space 20 is vacant. In this case, for example, a notification indicating the position of the rental space 20 for which the trash call button has been operated is transmitted to the mobile terminal apparatus or the like of the cleanup worker. However, in some cases a trash can is not placed to avoid dangerous goods to be left. In this case, trash bags may be placed in the rental space 20, and the user may be prompted to throw away the trash bag in a trash can in a station, an office, or a commercial facility. In this case, the places of available trash cans may be indicated because throwing away of trash from outside is prohibited in some places.

Alternatively, the cloud server 12 may recognize a trash can in an image captured by the camera 26 and may determine from the image whether or not trash is about to overflow. If it is determined that trash is about to overflow, the cloud server 12 may perform processing of notifying a cleanup worker contracted in advance or a station cleanup worker.

In the above-described exemplary embodiment, an example of a dedicated space is given as the rental space 20, but the rental space 20 is not limited thereto. For example, a space usually used for other purposes may be used as a temporary rental space during only a specific time period. In this case, the cloud server 12 may perform processing of further prompting a user to place equipment and tools to be used in the temporary rental space 20 (for example, a wireless router, stationery, and the like) in the original places or to hand them over to on-site staff.

In the above-described exemplary embodiment, for example, several types of air sprays, aromatic equipment, or the like may be provided for measures against smells so that a user's favorite aroma can be designated, and processing of prompting the preceding user to use the designated aroma during cleaning may be performed. For example, the user may be allowed to register information about a favorite aroma as registration information, and the cloud server 12 may notify the preceding user of the registration information of the next user. Alternatively, the user may be prompted to perform cleaning with the door or window open. If a ventilation facility is provided, the user may be prompted to operate the ventilation facility. Alternatively, the ventilation facility may be automatically driven for a predetermined time period. Alternatively, the door may be configured to be kept open after being opened during cleaning. For example, if the door is configured to slide in the direction of naturally being closed and being automatically locked at a terminal portion, this operation may be cancelled during cleaning.

Figure 9:
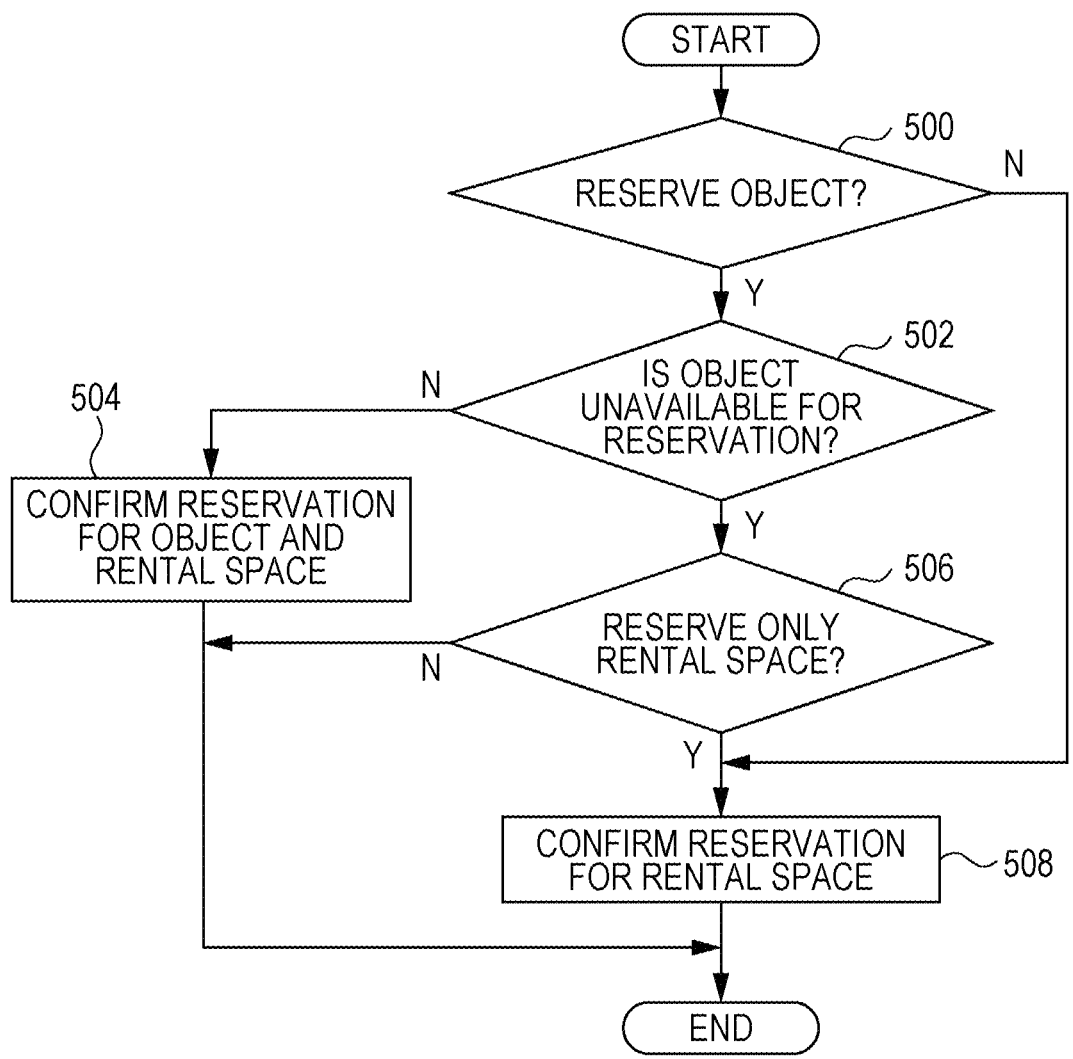
FIG. 9 is a flowchart illustrating an example of a process flow performed by the cloud server in the case of reserving an object to be used in addition to the rental space.

In the above-described exemplary embodiment, a description has been given of an example in which the cloud server 12 only reserves the rental space 20 in the process illustrated in FIG. 6, but the exemplary embodiment is not limited thereto. For example, the cloud server 12 may also reserve an object to be used in the rental space 20, such as equipment, a jig, or a tool. Specifically, in the process illustrated in FIG. 6, the cloud server 12 performs the process illustrated in FIG. 9 instead of step 222. FIG. 9 is a flowchart illustrating an example of a process flow performed by the cloud server 12 in the case of reserving an object to be used in addition to the rental space 20.

In step 500, the CPU 12A determines whether or not an object to be used is to be reserved. Specifically, for example, the reservation screen operated by using the mobile terminal apparatus 14 is provided with a reservation item for an object to be used, such as equipment, a jig, and a tool, and the CPU 12A determines whether or not the reservation item has been selected. If the determination is affirmative, the process proceeds to step 502. If the determination is negative, the process proceeds to step 508.

In step 502, the CPU 12A determines whether or not the object to be used is unavailable for reservation. Specifically, for example, the CPU 12A determines, on the basis of the reservation status of the object to be used of the designated reservation item, whether or not the object is unavailable for reservation. If the determination is negative, the process proceeds to step 504. If the determination is affirmative, the process proceeds to step 506. The reservation status of the object to be used may be managed by the cloud server 12, or may be managed by a server other than the cloud server 12. If another server manages the reservation status, the cloud server 12 acquires the reservation status from the other server and determines whether or not the object to be used is unavailable for reservation.

In step 504, the CPU 12A confirms the reservation for the object to be used and the rental space 20, and then the process ends. Specifically, the CPU 12A adds reservation information to the reservation status stored in the DB 12I and notifies the mobile terminal apparatus 14 that the reservation has been confirmed, thereby displaying confirmation of the reservation on the display 14F of the mobile terminal apparatus 14.

On the other hand, in step 506, the CPU 12A determines whether or not only the rental space 20 is to be reserved. Specifically, for example, the reservation screen operated by using the mobile terminal apparatus 14 is provided with, in addition to the reservation item for an object to be used, an item for selecting whether or not to reserve only the rental space 20 if the object to be used is unavailable for reservation, the user is allowed to make a selection, and thereby a determination is made. If the determination is affirmative, the process proceeds to step 508. If the determination is negative, the reservation for the rental space 20 is cancelled and the process ends.

In step 508, the CPU 12A confirms the reservation for the rental space 20, and then the process ends. Specifically, the CPU 12A adds reservation information to the reservation status stored in the DB 12I and notifies the mobile terminal apparatus 14 that the reservation has been confirmed, thereby displaying confirmation of the reservation on the display 14F of the mobile terminal apparatus 14.

The cloud server 12 performs the process in this way, and accordingly the reservation for an object to be used in the rental space 20, such as equipment, a jig, or a tool, is made together with the reservation for the rental space 20.

If the object to be used in the rental space 20 is unavailable for reservation, the reservation for the rental space 20 can be cancelled.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the individual components of the information processing system 10 according to the above-described exemplary embodiment may be processing performed by software, hardware, of both of software and hardware. In addition, the processing performed by the individual components of the information processing system 10 may be stored as a program in a storage medium, which may be distributed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor programmed to:
   acquire reservation information on a reservation of a rental space,
   receive an unlock instruction from a user terminal,
   transmit the unlock instruction to the rental space,
   cause, via the unlock instruction, a door lock integrated with the rental space to be unlocked at a time of a start of the reservation, so that a door of the rental space is unlocked,
   acquire a first image of the rental space before a user uses the rental space, and acquire a second image of the rental space when or after the user uses the rental space, the first image and the second image being captured by a camera, and evaluate a cleanliness of the rental space based on a comparison of the first image and the second image, and
   perform, using the reservation information, processing of prompting the user to perform a task of cleaning the rental space that is to be performed when or after the user uses the rental space if (i) the cleanliness does not satisfy a predetermined criteria and (ii) if the processor acquired information indicating that the user agreed to perform the task of cleaning.

2. The information processing apparatus according to claim 1, wherein the processor is programmed to:

perform processing of prompting the user to perform the task of cleaning the rental space in a case where the rental space is not reserved for a predetermined time period.

3. The information processing apparatus according to claim 1 wherein the processor is programmed to:
in a case where the rental space is continuously used with a plurality of reservations, perform, a predetermined time period before an end time of a last one of the plurality of reservations, processing of prompting the user to perform the task of cleaning the rental space.

4. The information processing apparatus according to claim 1, wherein the processor is programmed to:
perform processing of prompting the user to perform another task of making the rental space in accordance with a next reservation.

5. The information processing apparatus according to claim 2, wherein the processor is programmed to:
perform processing of prompting the user to perform another task of making the rental space in accordance with a next reservation.

6. The information processing apparatus according to claim 3, wherein the processor is programmed to:
perform processing of prompting the user to perform another task of making the rental space in accordance with a next reservation.

7. The information processing apparatus according to claim 4, wherein the processor is programmed to:
acquire information on a next user, and
in a case where the next user is a physically handicapped person, perform processing of prompting the user to perform, as the task of making the rental space in accordance with a next reservation, a task of moving an obstacle near an entrance of the rental space.

8. The information processing apparatus according to claim 5, wherein the processor is programmed to:
acquire information on a next user, and
in a case where the next user is a physically handicapped person, perform processing of prompting the user to perform, as the task of making the rental space in accordance with a next reservation, a task of moving an obstacle near an entrance of the rental space.

9. The information processing apparatus according to claim 6, wherein the processor is programmed to:
acquire information on a next user, and
in a case where the next user is a physically handicapped person, perform processing of prompting the user to perform, as the task of making the rental space in accordance with a next reservation, a task of moving an obstacle near an entrance of the rental space.

10. The information processing apparatus according to claim 1, wherein the processor is programmed to:
further perform processing of accepting a reservation for the rental space, and
when accepting the reservation, perform processing of prompting the user to perform the task.

11. The information processing apparatus according to claim 10, wherein the processor is programmed to:
further perform processing of accepting a reservation for a predetermined object to be used in the rental space.

12. The information processing apparatus according to claim 11, wherein the processor is programmed to:
cancel the reservation for the rental space in a case where the object to be used is unavailable for reservation.

13. The information processing apparatus according to claim 1, wherein the processor is programmed to:
further perform processing of rewarding the user in accordance with a result of evaluation of the cleanliness.

14. The information processing apparatus according to claim 13, wherein the processor is programmed to:
acquire predetermined information which is a result of evaluation of a task performed by the user, the evaluation being made by a next user, and
perform processing of rewarding the user in accordance with the acquired result of evaluation.

15. An information processing system comprising:
an information processing apparatus comprising a processor programmed to:
acquire reservation information on a reservation of a rental space,
receive an unlock instruction from a user terminal,
transmit the unlock instruction to the rental space,
cause, via the unlock instruction, a door lock integrated with the rental space to be unlocked at a time of a start of the reservation, so that a door of the rental space is unlocked,
acquire a first image of the rental space before a user uses the rental space, and acquire a second image of the rental space when or after the user uses the rental space, the first image and the second image being captured by a camera, and evaluate a cleanliness of the rental space based on a comparison of the first image and the second image, and
perform, using the reservation information, processing of prompting the user to perform a task of cleaning the rental space that is to be performed when or after the user uses the rental space if (i) the cleanliness does not satisfy a predetermined criteria and (ii) if the processor acquired information indicating that the user agreed to perform the task of cleaning; and
a mobile terminal apparatus that reserves the rental space and displays information provided by the information processing apparatus.

16. A non-transitory computer readable medium storing a program causing a computer to execute a process for information processing, the process comprising:
acquiring reservation information on a reservation of a rental space;
receiving an unlock instruction from a user terminal;
transmitting the unlock instruction to the rental space;
causing, via the unlock instruction, a door lock integrated with the rental space to be unlocked at a time of a start of the reservation, so that a door of the rental space is unlocked;
acquiring a first image of the rental space before a user uses the rental space, and acquiring a second image of the rental space when or after the user uses the rental space, the first image and the second image being captured by a camera, and evaluating a cleanliness of the rental space based on a comparison of the first image and the second image, and
determining (i) that the cleanliness does not satisfy a predetermined criteria and (ii) that the computer acquired information indicating that the user agreed to perform a task of cleaning; and
performing, using the reservation information, processing of prompting the user to perform the task of cleaning the rental space that is to be performed during or after the user uses the rental space.

* * * * *